US008452649B1

(12) United States Patent
Allen et al.

(10) Patent No.: US 8,452,649 B1
(45) Date of Patent: May 28, 2013

(54) COMPUTER-BASED METHODS AND ARRANGEMENTS FOR CONSUMER-DIRECTED MARKETING PROGRAM

(75) Inventors: Gene Allen, Vadnais Heights, MN (US); Ryan Wilder, Elk River, MN (US)

(73) Assignee: TCF Financial Corporation, Minneapolis, MN (US)

( * ) Notice: Subject to any disclaimer, the term of this patent is extended or adjusted under 35 U.S.C. 154(b) by 1670 days.

(21) Appl. No.: 11/654,385

(22) Filed: Jan. 17, 2007

(51) Int. Cl.
*G06Q 30/00* (2012.01)

(52) U.S. Cl.
USPC ............................................. 705/14.1

(58) Field of Classification Search
USPC .................................................. 705/14, 64
See application file for complete search history.

(56) References Cited

U.S. PATENT DOCUMENTS

| | | | |
|---|---|---|---|
| 5,025,372 A * | 6/1991 | Burton et al. | 705/14 |
| 5,774,870 A | 6/1998 | Storey | |
| 6,009,412 A | 12/1999 | Storey | |
| 6,578,012 B1 | 6/2003 | Storey | |
| 2003/0229596 A1 * | 12/2003 | Martinez | 705/64 |

* cited by examiner

*Primary Examiner* — Saba Dagnew
(74) *Attorney, Agent, or Firm* — Crawford Maunu PLLC

(57) ABSTRACT

Computer-based methods and arrangements are implemented using a variety of embodiments. According to one embodiment, a method is implemented for use with a financial institution's computer-managed marketing program. The method provides participation incentives to associations enrolled in the program based upon the program involvement of the enrolled associations. The financial institution enrolls associations in the program by assigning codes to the associations. The financial institution also enrolls a plurality of individuals having accounts with the financial institution in the program by associating each of the account numbers with one of the assigned codes. The assigned codes identify each of the plurality of individuals as a member of one of the enrolled associations. The financial institution determines a rating for each of the enrolled associations based upon the involvement of the enrolled associations in the program and then provides participation incentives to the enrolled associations based upon the ratings.

26 Claims, 4 Drawing Sheets

COMPUTER-BASED METHODS AND ARRANGEMENTS FOR CONSUMER-DIRECTED MARKETING PROGRAM

FIELD OF THE INVENTION

The present invention relates generally to computer-based methods and arrangements that use demographic-related data for automated management of consumer-directed marketing programs. An aspect of the present invention is more specifically directed to "recursive" computer-based methods and arrangements that use demographic-related data for automatically establishing relationships between a financial institution and individuals and/or their communities.

BACKGROUND

Demographic research has been used by a variety of organizations to better understand and target certain groups of consumers. For example, using demographics, consumers are targeted based upon age, gender, lifestyle, geographic location and multicultural demographics to name a few. Companies using such marketing efforts often hire a third party (e.g., an advertising agency) to assist the organization in determining which consumers to target. The purpose of such efforts is to reach as many consumers as possible in a time-effective and cost-effective manner.

Typically, demographic-based marketing programs are designed to monitor consumer spending habits for the purpose of further advertising to these consumers. For example, if a certain age group is known to frequent consumer electronics stores, the demographic-based marketing program would use this information as a basis for which to conduct advertising (e.g., mailings) of products typically purchased with electronics such as cabling, extended warranties, and entertainment centers.

One such program involves the use of gift certificates in incentive and promotional programs. There are many different types of consumers and not every gift certificate is appropriate for every consumer. For example, not every consumer is interested in a new stereo. As such, it is important to know as much as possible about the potential recipients in order to provide them with proper incentives. Retailers use demographics to determine which gift certificates to provide to specific groups of consumers.

The above and other issues have presented challenges to implementing a marketing program that reaches beyond these more tangible and identified spending habits of individual consumers.

SUMMARY

The claimed invention is directed to overcoming the above-mentioned challenges and others related to implementing a computer-managed marketing program for a financial institution. The present invention is exemplified in a number of implementations and applications, some of which are summarized below.

According to an example embodiment of the present invention, a computer-based method is implemented for use with a financial institution's computer-managed marketing program. The method provides participation incentives to associations enrolled in the program based upon the involvement of the enrolled associations in the program. The financial institution enrolls associations in the program by assigning codes to the associations. The financial institution also enrolls a plurality of individuals that have accounts with the financial institution in the program by associating each of the account numbers with one of the assigned codes. The assigned codes identify each of the plurality of individuals as a member of one of the enrolled associations. The financial institution determines a rating for each of the enrolled associations based upon the involvement of the enrolled associations in the program and then provides participation incentives to one or more of the enrolled associations based upon the ratings.

According to another example embodiment of the present invention, a recursive computer-based method, for use with a financial institution's computer-managed marketing program, uses demographic-related data to automatically establish relationships between a financial institution and individuals and/or their communities. The financial institution enrolls associations in the program by assigning codes to the associations. The financial institution also enrolls a plurality of individuals that have accounts with the financial institution in the program by associating each of the account numbers with one of the assigned codes. The assigned codes identify each of the plurality of individuals as a member of one of the enrolled associations. The financial institution uses the response of the enrolled associations and their individual members to previous marketing efforts to determine ratings for each of the enrolled associations. The financial institution then uses these ratings to determine which of the enrolled associations to target with marketing promotions in an effort to encourage participation in the program by the enrolled associations and their individual members.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
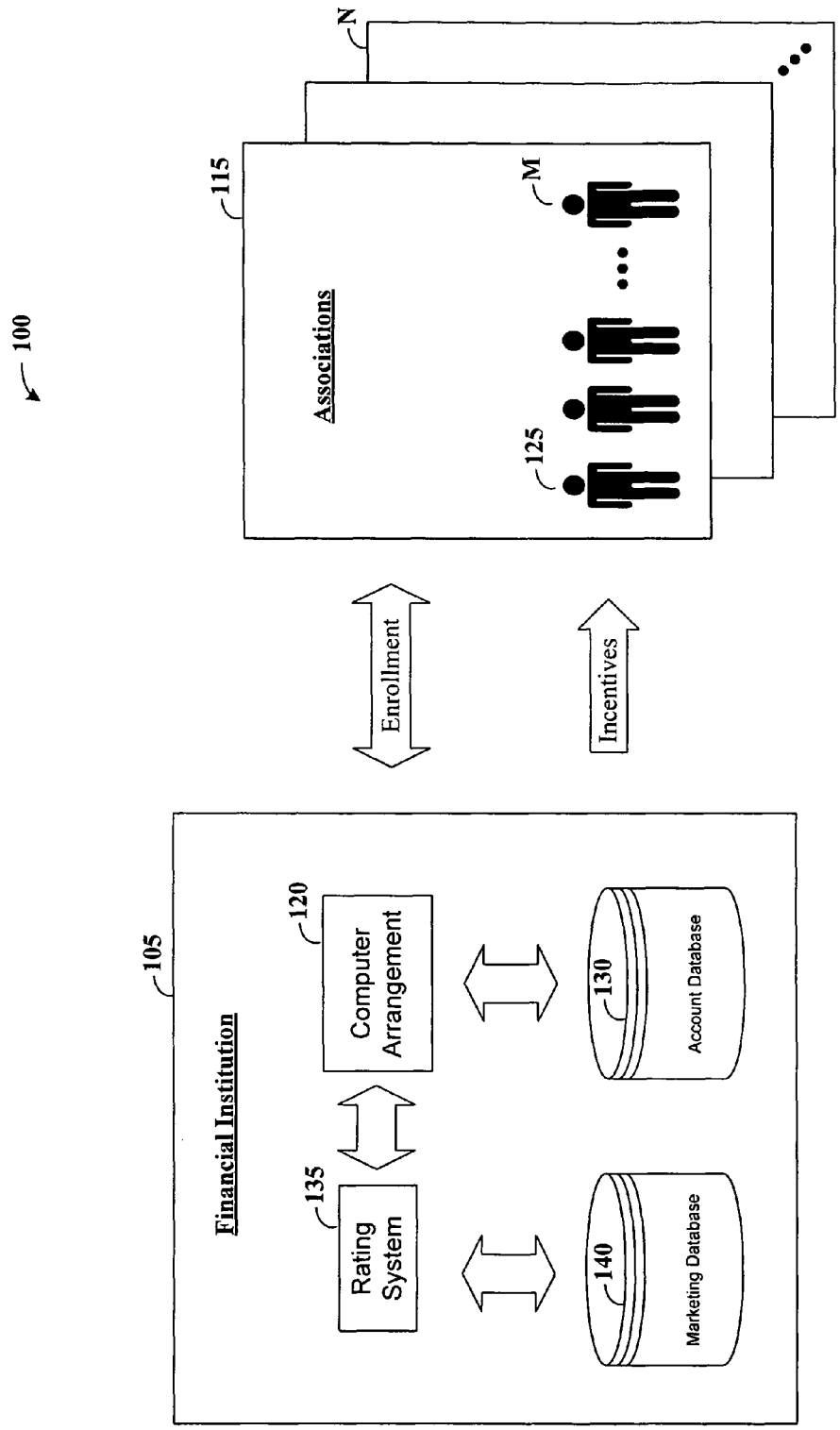
FIG. 1 shows an arrangement for implementing a financial institution's computer-managed marketing program according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular example embodiments described and claimed. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for implementing a computer-managed marketing program for a financial institution that provides participation incentives to associations. While the present invention is not necessarily limited to such applications, various aspects of the invention may be appreciated through a discussion of several examples using this context.

According to an example embodiment of the present invention, a computer-based method is implemented for use with a financial institution's computer-managed marketing program. The method uses feedback from customers and communities in which the customers are involved and provides participation incentives to associations enrolled in the program based upon feedback regarding the involvement of the enrolled associations (e.g., by individuals in the associations) in the program. The financial institution enrolls associations in the program by assigning codes to the associations. The financial institution also enrolls a plurality of individuals that have accounts with the financial institution in the program by associating each of the individual's account numbers with one of the assigned codes. The assigned codes identify each of the plurality of individuals as a member of one of the enrolled associations. The financial institution determines a rating for each of the enrolled associations based upon feedback regarding the involvement of the enrolled associations in the program and then provides incentives to one or more of the enrolled associations based upon the ratings. In one implementation, incentives are directly provided to individual members of the enrolled associations based upon the ratings.

The program provides incentives to the associations and to individual members of the associations. The incentives encourage the individuals that have accounts with the financial institution to provide the financial institution with the identity of the associations to which they belong. The program also provides the enrolled associations with incentive to encourage their members to open accounts and/or conduct other business with the financial institution.

According to another example embodiment of the present invention, a financial institution's computer-managed marketing program provides participation incentives to associations. The financial institution provides incentives designed to encourage the associations and individual members of the associations to open accounts and/or conduct other business with the financial institution. For example, the financial institution may give basketballs to a youth basketball league in order to provide the members of the league (e.g., the children's parents) with incentive to do business with the financial institution. Moreover, promotional material can be incorporated with the incentives, such as basketballs with the financial institution's name and/or logo on them. The financial institution rates various associations in order to determine which associations receive the incentives. The ratings can be based on the size of the associations, the income levels of their members, the results of previous promotions, and/or any other information relevant in determining which associations to target.

For the results of previous incentives or promotions to be used in future ratings, the financial institution first associates involvement data with a given incentive or promotion (i.e., how much business can be attributed to an incentive). The financial institution then uses that information to develop a rating that can be used to determine which associations to target in the future. For example, the results of a previous promotional activity relative to a youth basketball league in geographic region X can be used to determine whether to target other basketball associations in region X, target basketball associations in other geographic regions, and/or target other types of associations in region X (i.e., a youth hockey league). In one implementation, the financial institution targets an association in a geographic region that is likely to have different individual members than an association that was previously targeted in that geographic region. For example, a youth hockey league and a youth basketball league are likely to have different members because a participant in one sport is not likely to play the other sport because both sports are winter sports. By targeting two associations that are likely to have different individual members, the financial institution can reach individuals who were not previously targeted.

Turning now to the figures, FIG. 1 shows an arrangement 100 for implementing a computer-managed marketing program for a financial institution according to an example embodiment of the present invention. The financial institution 105 has a program that provides participation incentives to associations 115-N. Examples of associations include, but are not limited to, athletic associations, social clubs, non-profit organizations, businesses, and other similar types of groups. A computer arrangement 120 enrolls the associations 115-N in the program by assigning a code to each of the associations. Each of the associations 115-N have a plurality of individuals that are members of the associations. Some of the individuals 125-M have accounts with the financial institution 105. Information relating to these accounts is stored in account database 130 by the financial institution 105. The associations 115-N can also have accounts with the financial institution 105, information about which are stored in the account database 130.

The computer arrangement 120 further enrolls the individuals 125-M that have accounts with the financial institution 105 in the program by associating the individuals' account numbers with one of the codes assigned to the associations 115-N. The relationship between the account numbers and the assigned codes identifies the individuals 125-M as members of the associations 115-N. In one implementation, the individuals' account numbers are associated with one of the assigned codes for each of the associations 115-N of which the individuals 125-M are members. In another implementation, individuals' account numbers are associated with the associations 115-N on a percentage basis. For example, an individual 125 that opens a savings account with the financial institution 105 could be a member of two associations that are enrolled in the program. The two associations are each allocated one-half of the credit for the individual's involvement (i.e., opening the savings account). In yet a further implementation, the individuals' account numbers are associated with only one of the assigned codes, and an individual 125 can choose the enrolled association that is associated with their account. This can be particularly useful for avoiding one individual's involvement being credited to multiple associations.

A rating system 135 is used by the financial institution 105 to determine a rating for each of the enrolled associations 115-N. The ratings are based upon the involvement of the enrolled associations 115-N, and the enrolled individuals 125-M that are members of the associations, in the program. Information concerning the program, including the involvement of the associations 115-N and the individuals 125-M, is stored by the financial institution 105 in marketing database 140. Involvement in the program includes member involvement such as opening new accounts (e.g., checking accounts, savings accounts, certificates of deposit, and money market accounts), approval for a loan (e.g., mortgage, home equity, and car) and referral of an individual that is not member of an association 115. The rating system 135 can also take into account the size of an association 115 (e.g., the number of members or net worth) and the length of time that the association has been involved in the program. In one implementation, the rating system 135 takes into account the response of the enrolled associations 115-N to previous incentives given to the associations. One aspect of the rating system 135 includes whether a previous incentive to an association 115 resulted in new accounts being opened at the financial institution. The rating system 135 can also be used to rank the associations 115-N according to the type of association. For example, the associations 115-N are grouped by type and the rating system ranks the associations in each group independent of the other groups. The rating can then be used to determine which of the associations in each group receive incentives. In another implantation, the rating system ranks the associations by geographic location to determine which associations in each geographic location are provided with incentives.

The financial institution 105 provides incentives to the associations 115-N and to the individuals 125-M that are members of the associations based upon the ratings determined by the rating system 135. Incentives can also be given to the associations 115-N and to the individuals 125-M at random intervals in order to promote involvement in the program. Examples of incentives include, but are not limited to, concert tickets, money, sports tickets, airline tickets, athletic apparel, gift certificates and other similar types of items. In one implementation, an incentive is given to an individual 125 that has not previously received an incentive. In another implementation, an incentive in given to an individual that is a member of an association 115, however, the individual does not have an account with the financial institution 105. The types of incentives that are given to an association 115 and to the individuals 125-M that are members of the association can be based upon the type of the association. For example, tickets to sporting events are given to athletic associations (e.g., football tickets to a football club, hockey tickets to a hockey club). In one implementation, the association 115 is a non-profit organization and the incentive may qualify as a donation for tax purposes.

One of skill in the art would recognize that the various aspects of the computer-managed marketing program can be carried out using one or more general purpose processors, and/or implemented using one or more software modules. For example, the rating system 135 can be implemented using a single general purpose processor or different aspects of the rating system can be carried out using different processors.

Figure 2:
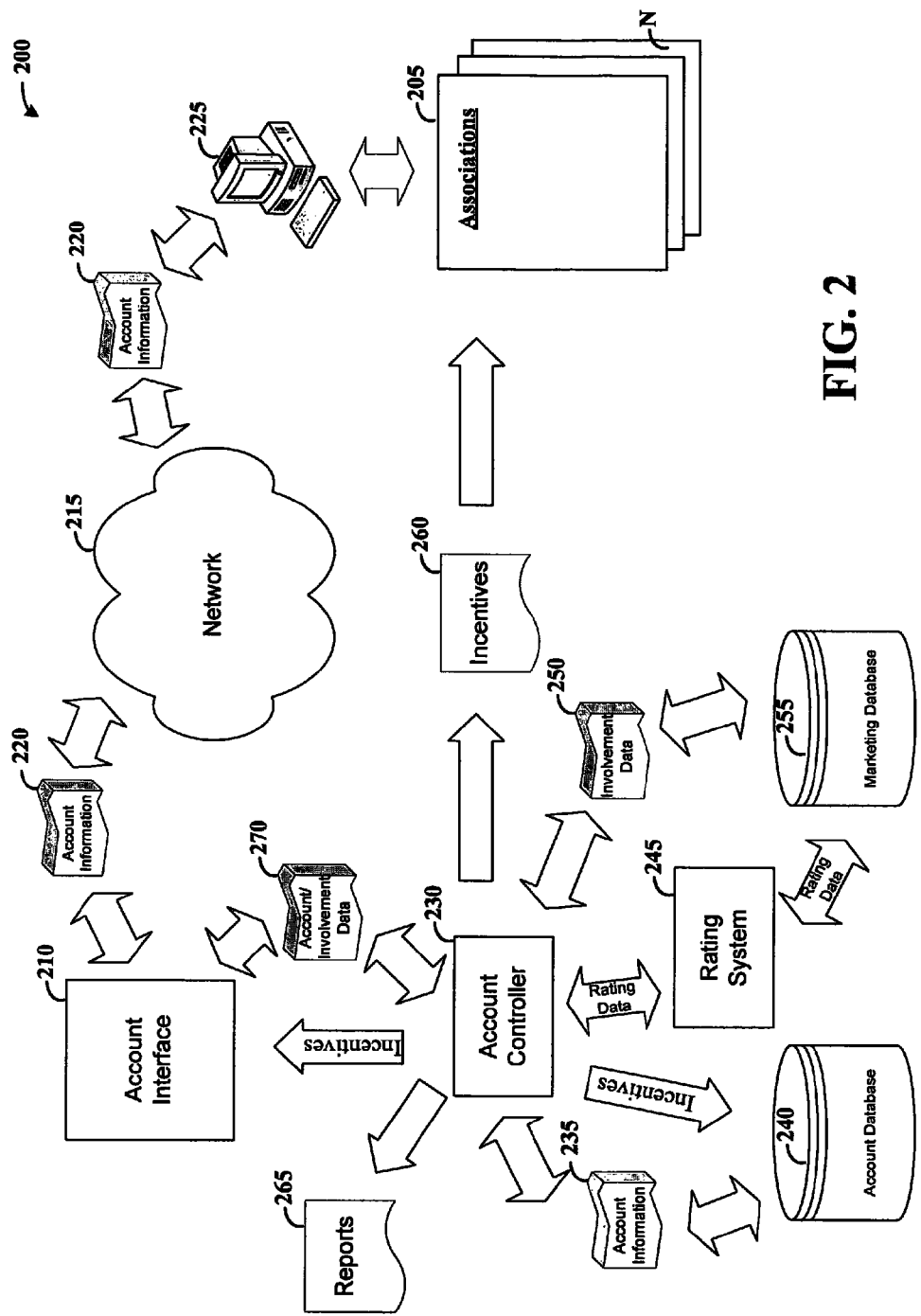
FIG. 2 shows data flow for a financial institution's computer-managed marketing program according to one example embodiment of the present invention.

FIG. 2 shows data flow for a financial institution's computer-managed marketing program 200 according to another example embodiment of the present invention. Associations 205-N are enrolled in a financial institution's program. The Associations 205-N can access the program through account interface 210, which is run by or on behalf of the financial institution, using packet-based network 215. In one implementation, the account interface 210 is a website, the network 215 is the Internet and an association 205 uses a computer 225 to access the account interface. The associations 205-N access account information 220 through the account interface 210. The account information 220 can include information regarding any accounts that an association has with the financial institution, the involvement of the association and its members in the program and the incentives that the association and its members have received. In this manner, the associations 205-N can track their involvement in the program. The financial institution limits the account information 220 that is accessible to each of the associations 205-N. For, example, the financial institution may limit an association 205 such that it can only access its own account information 220. This can be accomplished using various security measures, such as assigning a user name and password to the association.

The account controller 230 manages and controls the accounts and the marketing program. The account controller accesses account information 235 from accounts database 240 for accounts held by the associations 205-N, including individuals that are members of the associations. The account controller 230 is also provided with rating data from rating system 245 and involvement data 250 (i.e., information about the involvement of the associations 205-N and their members in the program) from marketing database 255. The account controller 230 uses the rating data to determine when to provide incentives 260 to the associations 205-N and/or individual members of the associations. The incentives 260 can include items from a third party (e.g., event tickets) that are given by the financial association to the associations 205-N or that can be given directly to the associations by the third party on behalf of the financial institution. In one implementation, the incentives are provided by crediting accounts in accounts database 240. In another implementation, the incentives are provided through account interface 210 (e.g., by e-mail). The account controller 230 can also issue reports 265 regarding program activity on a periodic basis (e.g., daily, weekly, monthly). In one implementation, the reports 265 can be issued to the associations 205-N through account interface 210. The account controller 230 provides account and involvement data 270 to the account interface for access by the associations 205-N.

Figure 3:
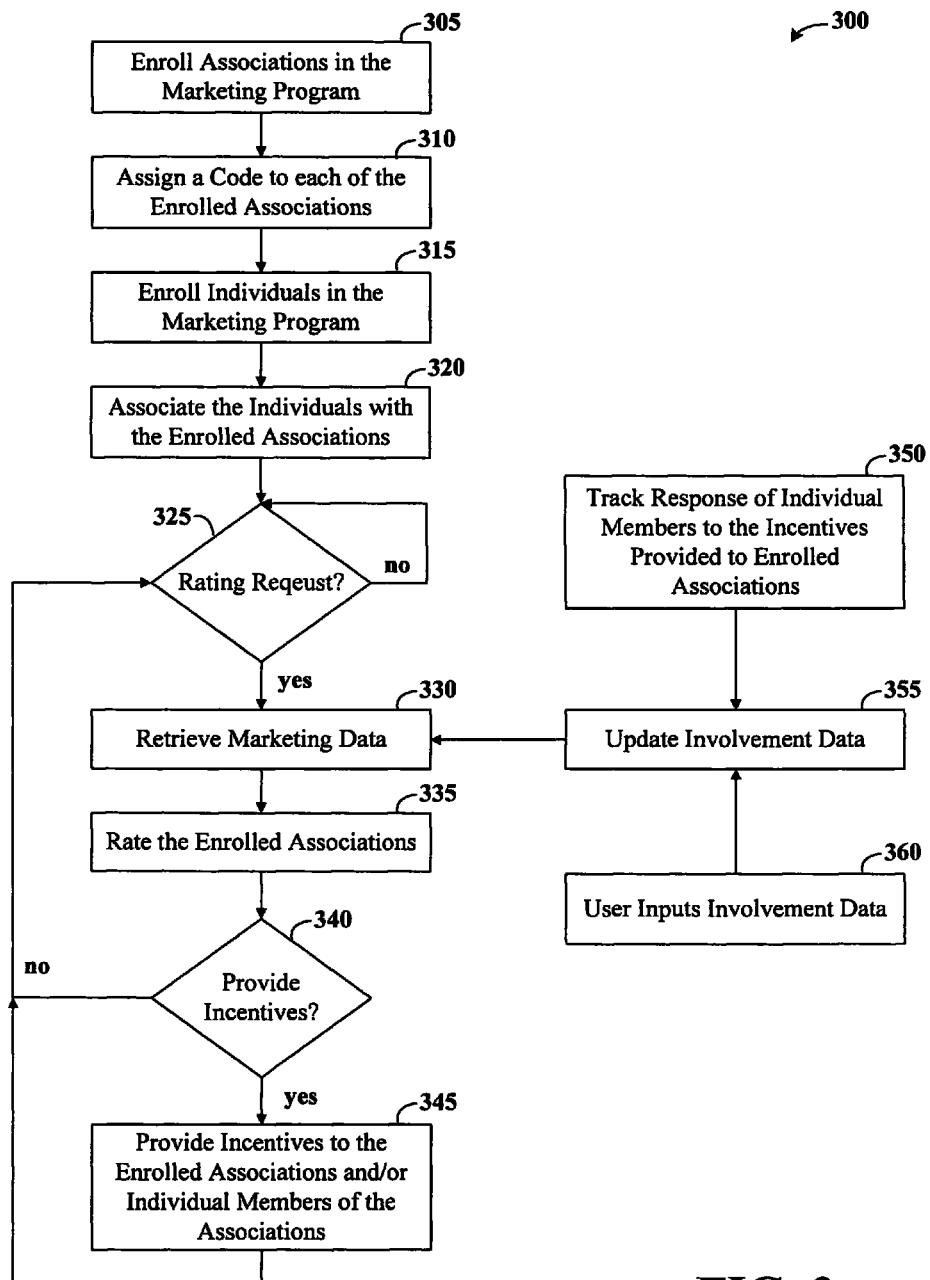
FIG. 3 is a flow diagram of a financial institution's computer-managed marketing program according to one example embodiment of the present invention.

FIG. 3 is a flow diagram 300 of a financial institution's computer-managed marketing program according to another example embodiment of the present invention. The financial institution enrolls associations in the marketing program at block 305. The associations are enrolled in the marketing program by assigning a code to each association at block 310. The financial institution also enrolls individuals, that have accounts with the financial institution and that are members of at least one of the enrolled associations, in the marketing program at block 315. In one implementation, the enrolled associations provide the financial institution with lists of their members and the financial institution enrolls those members that have accounts with the financial institution. In another implementation, the individuals that have accounts with the financial institution identify to which of the enrolled associations they belong. The individuals are enrolled in the marketing program by associating the codes assigned to the enrolled associations with the individuals' account numbers at block 320. The codes identify the individuals as members of the enrolled associations.

At block 325 a rating system (e.g., rating system 245 of FIG. 2) waits for a rating request. In one implementation, the rating request is received from a user via a user input. The rating request can also be from a computer that automatically requests ratings for the enrolled associations on a periodic basis (e.g., daily, weekly, monthly). When a rating request is received, marketing data (e.g., involvement, association and/or demographic data) is retrieved from a database (e.g., marketing database 255 of FIG. 2), as shown by block 330. The financial institution rates the enrolled associations at block 335 based upon the marketing data. In one implementation, the enrolled associations are rated based upon the involvement of the associations and the individual members of the associations in the marketing program. The financial institution then determines whether to provide incentives to enrolled associations and/or individual members of the associations at block 340 based upon the ratings determined at block 335. The financial institution provides incentives, if appropriate, at block 345.

At block 350, the financial institution tracks the responses of individual members to the incentives that are provided to the enrolled associations at block 345. For example, the financial institution might track whether an incentive resulted in individual members opening new accounts with the financial institution. The responses of the individuals are used to update the involvement data at block 355, which can then be used by the rating system when rating the enrolled associations at block 335. In one implementation, a user inputs involvement data (e.g., involvement information that can be associated with previous incentives) at block 360 that is used to update the involvement data at block 355.

Figure 4:
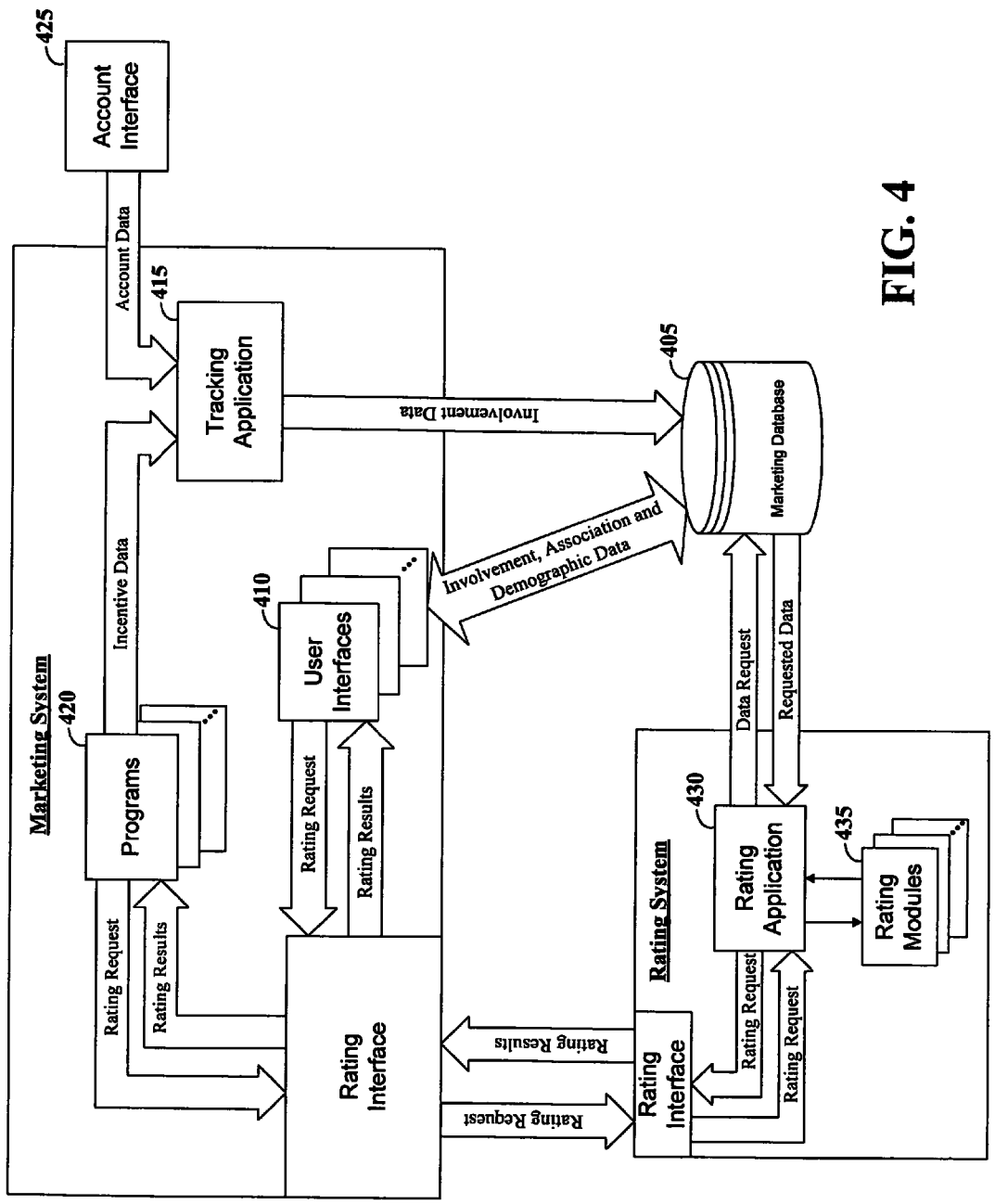
FIG. 4 shows data flow for a financial institution's computer-managed marketing program that uses feedback according to one example embodiment of the present invention.

FIG. 4 shows data flow for a financial institution's computer-managed marketing program that uses feedback according to further example embodiment of the present invention. A marketing database 405 is used to store marking data including association data that identifies associations and their individual members, demographic data about the associations and their members (e.g., income levels of the members, sizes of the associations and geographic locations of the associations and their members), and involvement data for the associations (e.g., the responses of the associations' members to previous marketing efforts). One of skill in the art would recognize that the various marketing data can be stored in one or more databases and also that the various marketing data can be stored in partitioned portions of marketing database 405. The marketing data can be collected by the financial institution and/or by a third party on behalf of the financial institution. The marketing data is entered into market database 405 through user interfaces 410.

The financial institution uses tracking application 415 to track the results of previous marketing efforts and then uses this information (e.g., involvement data) to determine which associations to target. The tracking application 415 receives incentive data (e.g., data about incentives provided to associations and promotions directed towards the associations) from programs 420 (e.g., an advertising program, a promotional program and an incentive program) and account information from account interface 425. The tracking application 415 uses the incentive and account data to determine the responses of individual members of the associations to incentives provided to the associations (e.g., whether an incentive resulted in members opening new accounts). The financial institution then uses the involvement data to determine whether to provide additional incentives to an association, to provide incentives to other similar types of associations, and/or to provide incentives to different types of associations in the same geographic area.

The user interfaces 410 and/or the programs 420 initiate a ratings request that is used by the financial institution to determine which associations to target. For example, a request can be made to rate all associations, to rate certain types of associations and/or to rate the associations by geographical location. The rating request is sent to rating application 430 to determine the requested ratings. The rating application 430 accesses marketing data (e.g., involvement data, association data and/or demographic data) from marketing database 405. The rating application 430 rates the associations using rating modules 435 based upon the requested marketing data. Different rating modules 435 are used based upon the type of rating request (e.g., a request to rate the associations by type or by geographic location). The rating results are then provided to the user interfaces 410 and/or to the programs 420, which use the ratings to determine which associations to target. In one implementation, the programs make rating requests on a periodic basis (e.g., daily, weekly, monthly).

According to another example embodiment of the present invention, a financial institution has a set amount of funds for providing incentives to associations that are enrolled in its computer-managed marketing program. The financial system uses a rating system to determine which of the enrolled associations to provide with incentives and the amount of each incentive. The rating system takes in to account the limited amount of funds available for providing the incentives. For example, in the situation where that financial institution desires to provided incentives to multiple enrolled associations but there are only funds available to provide incentives to some of these associations, the rating system ranks the associations to determine which ones are provided with incentives and/or the amount allocated for the incentives that are to be provided to each association.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, which is set forth in the following claims.

What is claimed is:

1. A computer-based method for use with a financial institution's marketing program that provides participation incentives to associations enrolled in the marketing program based upon involvement of the enrolled associations in the marketing program, the computer-based method comprising:

by using at least one computer processor,
enrolling associations in the marketing program by assigning codes to the associations;
enrolling a plurality of individuals with account numbers in the marketing program by associating each of the account numbers with one of the assigned codes, wherein the assigned codes identify each of the plurality of individuals as a member of one of the enrolled associations;
determining a rating for each of the enrolled associations based upon the involvement;
providing an incentive to an enrolled association from the enrolled associations based upon the rating;
wherein providing the incentive to the enrolled association includes providing incentives to both the enrolled association and at least one individual that is a member of the enrolled association; and
wherein the at least one individual is selected based on the individual not having previously received an incentive.

2. The method of claim 1, wherein providing an incentive to the enrolled association based upon the rating includes providing an incentive to one or more individuals that are members of the enrolled association.

3. The method of claim 1, wherein the involvement in the marketing program includes account activity of individuals that are members of the enrolled associations.

4. The method of claim 1, further comprising providing packet-based remote access to a computer arrangement by each of the enrolled associations, thereby permitting each enrolled association to monitor status of its involvement in the marketing program.

5. The method of claim 1, wherein determining a rating for each of the enrolled associations includes determining the involvement in the marketing program that qualifies the enrolled associations for the incentive.

6. The method of claim 1, further comprising determining a type of the incentive based upon a type of the enrolled association that is to receive the incentive.

7. The method of claim 1, wherein enrolling the plurality of individuals with account numbers includes associating each of the account numbers with the assigned codes of each of the enrolled associations of which the plurality of individuals are members.

8. The method of claim 1, wherein the step of associating each of the account numbers with one of the assigned codes is responsive to one or more of the plurality of individuals identifying their membership to one of the enrolled associations.

9. The method of claim 1, wherein the enrolled association is a non-profit organization and the incentive is a donation to the non-profit organization.

10. The method of claim 1, further comprising generating a report of the enrolled associations' involvement in the marketing program.

11. The method of claim 1, wherein the involvement in the marketing program includes individuals that are members of the enrolled associations opening accounts with the financial institution.

12. The method of claim 1, wherein the involvement in the marketing program includes responses by the enrolled associations to previous incentives provided by the marketing program.

13. The method of claim 1, wherein the incentive is a credit by the financial institution to an account held at the financial institution on behalf of the enrolled association.

14. The method of claim 1, wherein the incentive is provided to the enrolled association by a third party on behalf of the financial institution.

15. A computer arrangement for use with a financial institution's marketing program that provides participation incentives to associations enrolled in the marketing program based upon involvement of the enrolled associations in the marketing program, wherein the computer arrangement is configured and arranged to perform the method of claim 1.

16. A computer arrangement configured for performing the method of claim 1, wherein the computer arrangement includes:
an enrollment processor that is configured and arranged to perform the step of enrolling associations in the marketing program;
a rating processor that is configured and arranged to perform the step of determining a rating for each of the enrolled associations based upon the involvement; and
a marketing processor that is configured and arranged to of providing an incentive to an enrolled association from the enrolled associations based upon the rating.

17. The arrangement of claim 16, wherein providing an incentive to the enrolled association includes providing an incentive to one or more individuals that are members of the enrolled association.

18. The arrangement of claim 16, wherein the involvement in the marketing program includes account activity of individuals that are members of the enrolled associations.

19. The arrangement of claim 16, further comprising a packet-based remote interface that can be used by the enrolled associations to monitor status of their involvement in the marketing program.

20. The arrangement of claim 16, wherein determining a rating for each of the enrolled associations includes determining the involvement in the marketing program that qualifies the enrolled associations for the incentive.

21. The arrangement of claim 16, wherein providing an incentive to the enrolled association based upon the rating includes providing incentives to both the enrolled association and at least one individual that is a member of the enrolled association.

22. The arrangement of claim 21, wherein the at least one individual is selected based upon whether the individual previously received an incentive.

23. The arrangement of claim 16, wherein the step of associating of each of the account numbers with one of the assigned codes is responsive to one or more of the plurality of individuals identifying their membership to one of the enrolled associations.

24. The arrangement of claim 16, further comprising generating a report of the enrolled associations' involvement in the marketing program.

25. The arrangement of claim 16, wherein the involvement in the marketing program includes individuals that are members of the enrolled associations opening accounts with the financial institution.

26. The arrangement of claim 16, wherein the involvement in the marketing program includes responses by the enrolled associations to previous incentives provided by the marketing program.

\* \* \* \* \*

UNITED STATES PATENT AND TRADEMARK OFFICE
CERTIFICATE OF CORRECTION

| | | |
|---|---|---|
| PATENT NO. | : 8,452,649 B1 | Page 1 of 1 |
| APPLICATION NO. | : 11/654385 | |
| DATED | : May 28, 2013 | |
| INVENTOR(S) | : Allen et al. | |

It is certified that error appears in the above-identified patent and that said Letters Patent is hereby corrected as shown below:

In the Claims

Col. 10, line 4, Claim 16: "to of" should read --to perform the step of--

Signed and Sealed this
Twenty-first Day of October, 2014

Michelle K. Lee
*Deputy Director of the United States Patent and Trademark Office*